(12) United States Patent
Tarantino et al.

(10) Patent No.: US 6,192,393 B1
(45) Date of Patent: *Feb. 20, 2001

(54) METHOD AND SYSTEM FOR PANORAMA VIEWING

(75) Inventors: Paul Tarantino, Santa Cruz; Michael Clifton, Los Gatos, both of CA (US)

(73) Assignee: MGI Software Corporation, Richmond Hill (CA)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/057,013

(22) Filed: Apr. 7, 1998

(51) Int. Cl.[7] .................................................. G06F 15/16
(52) U.S. Cl. ........................ 709/203; 709/218; 709/219; 345/425; 345/427; 345/428; 345/433; 345/439
(58) Field of Search .................................. 382/232, 233, 382/299; 709/203, 219, 204, 231, 218; 345/425, 427, 428, 429, 433, 437, 439

(56) References Cited

U.S. PATENT DOCUMENTS

| | | | |
|---|---|---|---|
| 5,263,136 | * 11/1993 | DeAguiar et al. | 395/511 |
| 5,307,180 | * 4/1994 | Williams et al. | 358/448 |
| 5,390,029 | * 2/1995 | Williams et al. | 358/448 |
| 5,396,583 | 3/1995 | Chen et al. | 395/127 |
| 5,446,833 | 8/1995 | Miller et al. | 395/125 |
| 5,524,197 | * 6/1996 | Uya et al. | 395/340 |
| 5,528,290 | * 6/1996 | Saund | 348/218 |
| 5,581,637 | * 12/1996 | Cass et al. | 382/284 |
| 5,615,287 | * 3/1997 | Fu et al. | 382/232 |
| 5,649,032 | * 7/1997 | Burt et al. | 382/284 |
| 5,682,441 | * 10/1997 | Ligtenberg et al. | 382/232 |
| 5,710,835 | * 1/1998 | Bradley | 382/233 |
| 5,748,194 | 5/1998 | Chen | 345/427 |
| 5,768,447 | * 6/1998 | Irani et al. | 382/305 |
| 5,850,352 | * 12/1998 | Moezzi et al. | 348/13 |
| 5,852,443 | * 12/1998 | Kenworthy et al. | 345/431 |
| 5,883,627 | * 3/1999 | Pleyer | 345/348 |
| 5,903,892 | * 5/1999 | Hoffert et al. | 707/10 |
| 5,905,819 | * 5/1999 | Daly | 382/284 |
| 5,912,670 | * 6/1999 | Lipscomb et al. | 345/419 |
| 5,949,428 | * 9/1999 | Toelle et al. | 345/431 |
| 5,956,026 | * 9/1999 | Ratakonda | 345/328 |
| 5,963,664 | * 10/1999 | Kumar et al. | 382/154 |
| 5,966,465 | * 10/1999 | Keith et al. | 382/232 |
| 5,983,176 | * 11/1999 | Hoffert et al. | 704/233 |
| 5,987,164 | * 11/1999 | Szeliski et al. | 382/154 |
| 5,995,095 | * 11/1999 | Ratakonda | 345/328 |

OTHER PUBLICATIONS

"FlashPix Format" Specification, Version 1.0.1, Eastman Kodak comapny, 1996, Jul. 10, 1997.

"Internet Imaging Protocol", Version 1.0.6., 1997, Hewlett Packard Comapny, Live Picture, Inc., and Eastman Kodak Company.

Website at http://www.livepicture.com (4 pgs.), May 19, 1998.

* cited by examiner

Primary Examiner—Kevin J. Teska
Assistant Examiner—William Thomson
(74) Attorney, Agent, or Firm—Blakely, Sokoloff, Taylor & Zafman

(57) ABSTRACT

A method and system for viewing panoramas over a server-client network including storing an image in tiled form on a server, receiving at a server from a client a request for at least a portion of the image, transmitting from the server to the client at least one tile corresponding to the at least a portion of the image requested by the client, and carrying out an individual tile-wise perspective correction on said at least one tile.

28 Claims, 6 Drawing Sheets

METHOD AND SYSTEM FOR PANORAMA VIEWING

FIELD OF THE INVENTION

The present invention relates to panorama viewing.

BACKGROUND OF THE INVENTION

The following U.S. patents are believed to be generally relevant to the field of the invention:

| | | | |
|---|---|---|---|
| 5,396,583 | 3/1995 | Chen et al | 395/127 |
| 5,446,833 | 3/1995 | Miller et al | 395/125 |

Panoramic images of scenes are used to provide a viewer with an immersive surround experience, as if the viewer was standing in the center of a scene gazing in several directions. Panoramic images can be produced by taking multiple snapshots of a scene, as a camera is rotated horizontally and possibly also vertically. The snapshots are stitched together and projected onto an appropriate geometrical surface, such as a cylinder or sphere, to reproduce an omniview effect.

Digital panoramic images are used inter alia to provide virtual reality experiences over the Internet. These images are normally stored on a host computer, or server, and accessed by users over the Internet. Software panorama production tools take digital snapshots as inputs, and numerically stitch them together and project them onto an appropriate curved surface. The digital snapshots may come from a digital camera, or from scanned in-pictures. An example of a software system used to produce panoramic images is assignee's PHOTOVISTA™ product, which can be accessed at http://www.livepicture.com.

Interactive panorama viewers comprise software that enables a client computer to display a portion of the panorama, so that a user sees a corresponding part of the surrounding scene. The viewers carry out perspective geometry transformations that project the panorama onto a view window. Although only a portion of the scene can be displayed within the view window, the panoramic viewer enables the user to interactively navigate the scene. User navigation includes (i) panning in several directions, which translates the viewable portion of the scene, and (ii) zooming in and out, which magnifies and reduces the scene, effectively changing the field of view. An example of a panorama viewer is assignee's LIVE PICTURE™ Viewer product, which can be accessed at http://www.livepicture.com.

To enable efficient implementations of interactive zooming within large images over the Internet, some software applications today are using multi-resolution tiled image formats. Multi-resolution tiled images are constructed by first creating multiple copies of the image at different resolutions. Moreover, at each resolution the image is partitioned into a collection of tiles.

FLASHPIX®, a registered trademark of the Digital Imaging Group (DIG), is an example of a multi-resolution tiled image format A FlashPix image is constructed by starting with an original image and recursively sub-sampling it at half the resolution. The recursion continues until the final sub-sampled image is reduced to 64 pixels or less in each dimension. Each image level is partitioned into tiles that are 64×64 pixels in size. A reference for FLASHPIX® is a document "FlashPix Format Specification," ©1996, 1997, Eastman Kodak Company, the contents of which are hereby incorporated by reference.

To illustrate the advantages of multi-resolution tiled image formats, suppose a client with a viewing window of 640×480 pixels desires to view an image whose full resolution is 15,000×15,000 pixels. The client is unable to view the full image at its original resolution, and can either view the complete image at a low resolution, or view only a portion of the image at a high resolution. Usually the user prefers to begin with an initial view showing the full image at a low resolution, and then to interactively navigate by zooming, i.e., increasing the resolution while decreasing the "field of view," or the portion of the image being viewed, and panning, i.e. translating the current view.

In order for a FlashPix image server to respond with an image at 640×480 pixel resolution that contains the full original image which is sub-sampled, an appropriate close pre-computed resolution is determined. Using the above dimensions, the successive resolutions are 15,000×15,000 pixels, then 7,500×7,500 pixels, then 3,750×3,750 pixels, then 1,875×1,875 pixels, then 937×937 pixels, etc. For example, the image server can choose an image level of 937×937 pixels and re-sample to 640×480 pixels. This is far better than re-sampling the full 15,000×15,000 pixel image because it requires far less processing.

FlashPix images are more complicated than simple raster images. The individual 64×64 pixel tiles into which each image level is partitioned are usually JPEG compressed for Internet applications. Furthermore, the FlashPix format specification requires that the tiles be stored within a Microsoft OLE structured storage file. Structured storage files are compound files composed of multiple storages and streams, where storages are analogous to folders/directories and streams are analogous to files. Although there is overhead in accessing information inside a structured storage file, such files provide a clean interface for a complicated file structure. Structured storage is referenced in Appendix A of the above-referenced FlashPix Format Specification.

Assignee's co-pending U.S. patent application Ser. No. 08/647,018 filed May 8, 1996 and entitled RENDERING PERSPECTIVE VIEWS OF A SCENE USING A SCANLINE-COHERENT LOOK-UP TABLE, the disclosure of which is hereby incorporated by reference, discloses a panorama viewing method and system. It describes an efficient way to provide pan and zoom navigational capabilities, so as to enable a user to have a smooth experience as the user interactively views panoramic images. To ensure smooth navigation it is important that the rendering be optimized so as to yield successive frame data at a refresh rate of approximately 30 frames/second.

Assignee's co-pending U.S. patent application Ser. No. 08/922,732 filed Sep. 3, 1997 and entitled A METHOD AND SYSTEM FOR COMPOSITING IMAGES, the disclosure of which is hereby incorporated by reference, describes a way to stitch panoramic snapshots together in a way that compensates for possible different lighting conditions in each snapshot. To reproduce an original scene, it is important that there be no visible signs of stitching between successive snapshots.

Assignee's co-pending U.S. patent application Ser. No. 09/055,038 filed Apr. 3, 1998 and entitled A METHOD AND SYSTEM FOR PANEL ALIGNMENT IN PANORAMAS, the disclosure of which is hereby incorporated by reference, describes a way to embed images within a panorama so as to match the curvature of the panorama.

SUMMARY OF THE INVENTION

The present invention concerns a method and system for viewing digital panoramic images, also referred to as panoramas, when the panorama is stored in a multi-resolution tiled image format, such as the FLASHPIX® format.

There is thus provided in accordance with a preferred embodiment of the present invention a method for viewing panoramas over a server-client network including storing an image in tiled form on a server, receiving at a server from a client a request for at least a portion of the image, transmitting from the server to the client at least one tile corresponding to the at least a portion of the image requested by the client; and carrying out an individual tile-wise perspective correction on the at least one tile.

In accordance with one preferred embodiment of the present invention the step of carrying out an individual tile-wise perspective correction takes place at the client.

Additionally in accordance with a preferred embodiment of the present invention the step of carrying out an individual tile-wise perspective correction includes carrying out a linear transformation of data in each of the at least one tile.

In accordance with another preferred embodiment of the present invention the step of carrying out an individual tile-wise perspective correction takes place at the server.

Still further in accordance with a preferred embodiment of the present invention the method also comprises the step of selecting the at least one tile which corresponds with the at least a portion of the image requested by the client.

Moreover in accordance with a preferred embodiment of the present invention the step of storing the image includes the step of storing the image at multiple resolutions in tiled form.

Additionally in accordance with a preferred embodiment of the present invention the step of selecting the at least one tile which corresponds with the at least a portion of the image requested by the client includes selecting at least one tile of a resolution appropriate to a viewing window available to the client.

Further in accordance with a preferred embodiment of the present invention the method also comprises the steps of caching tiles, received from the server, at the client, and in response to client requests which require at least one tile of a first resolution, temporarily employing at least one tile cached at the client, of a resolution different from the first resolution, until at least one required tile is received from the server.

There is also provided in accordance with a preferred embodiment of the present invention a panorama viewing system operating over a server-client network and including an image in tiled form stored on a server, a client request for at least a portion of the image, a transmitter, transmitting from the server to the client at least one tile corresponding to the at least a portion of the image requested by the client, and an image processor carrying out an individual tile-wise perspective correction on the at least one tile.

In accordance with one preferred embodiment of the present invention the image processor is situated at the client.

Additionally in accordance with a preferred embodiment of the present invention the image processor carries out a linear transformation of data in each of the at least one tile.

In accordance with another preferred embodiment of the present invention the image processor is situated at the server.

Still further in accordance with a preferred embodiment of the present invention the system also comprises a tile selector, selecting the at least one tile which corresponds with the at least a portion of the image requested by the client.

Moreover in accordance with a preferred embodiment of the present invention the image is stored at multiple resolutions in tiled form.

Additionally in accordance with a preferred embodiment of the present invention the selector selects at least one tile of a resolution appropriate to a viewing window available to the client.

Further in accordance with a preferred embodiment of the present invention the system also comprises a cache for caching tiles received from the server at the client, and a tile substitutor, temporarily employing, in response to client requests which require at least one tile of a first resolution, at least one tile cached at the client, of a resolution different from the first resolution, until at least one required tile is received from the server.

BRIEF DESCRIPTION OF THE DRAWINGS

The present invention will be understood and appreciated more fully from the following description, taken in conjunction with the drawings in which.

DETAILED DESCRIPTION OF PREFERRED EMBODIMENTS

Figure 1:
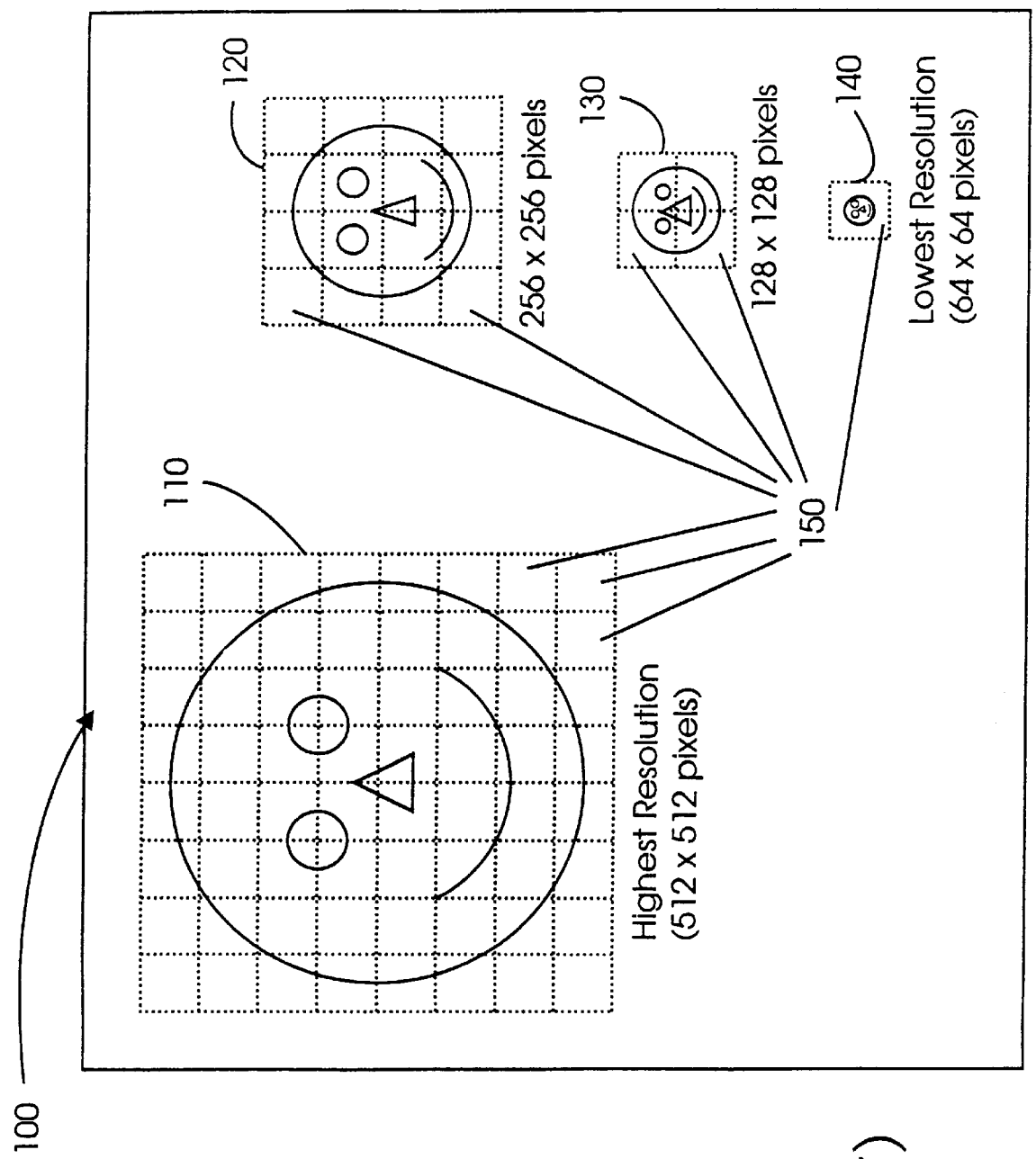
FIG. 1 is a simplified sketch of a prior art multi-resolution tiled image.

The present invention concerns a method and system for viewing digital panoramic images, also referred to as panoramas, when the panorama is stored in a multi-resolution tiled image format, such as the FLASHPIX® format. Reference is made to prior art FIG. 1 which is a simplified sketch of a multi-resolution tiled image 100. Image 100 contains within it a hierarchy containing typically four levels of image resolution, which are also termed herein "image levels". Typically such an image has a single image level 110 as its original source, and this image level 110 is then processed to build up the full hierarchy. The highest level of image 100 contains a 512×512 pixel image level 110. This image level 110 is at the highest resolution, and contains the most detail. The next highest level is a 256×256 pixel image level 120. Image level 120 typically is obtained by sub-sampling image level 110 by a factor of two in each dimension. Image level 120 has less detail than image level 110. The next highest level is a 128×128 pixel image level 130, typically obtained by sub-sampling image level 120 by a factor of two in each dimension. Finally, the lowest image level is a 64×64 image level 140, typically obtained by sub-sampling image level 130 by a factor of two in each dimension. Image level 140 is at such a low resolution that many of the details are lost.

Each of the four image levels, 110, 120, 130 and 140, is sub-divided into square portions 150 called tiles. A tile is typically a 64×64 block of pixels. Thus the image level 110 is comprised of 8 tiles across horizontally and 8 tiles up and down vertically. Each tile contains fine image detail, on the one hand, but covers only a small portion (1.6%) of the total image area. The image level 120 is comprised of 4 tiles across horizontally and 4 tiles up and down vertically. The tiles in this level contain less of the fine image detail than do the tiles from the image level 110, but they each span more area (6.2%) of the total image area. The image level 130 is comprised of 2 tiles across horizontally and 2 tiles up and down vertically. The tiles in this level contain very little fine image detail, but they each span 25% of the total image area. Finally, the lowest resolution image level 140 contains a single tile. This tile has no fine detail, and spans the entire image area.

When viewing a multi-resolution image interactively, the user typically begins by viewing the lowest image level that will fit within a pre-determined view window. In this way, the user can see as much of the image as possible, but without seeing the fine detail. The user then selectively zooms into the higher image levels, which enable the user to see finer details, but restrict the portion of the image that can be fit within the viewing window. In addition to zooming in and out, the user can also pan the image horizontally and vertically, to bring other portions of the image into the view window.

Figure 2:
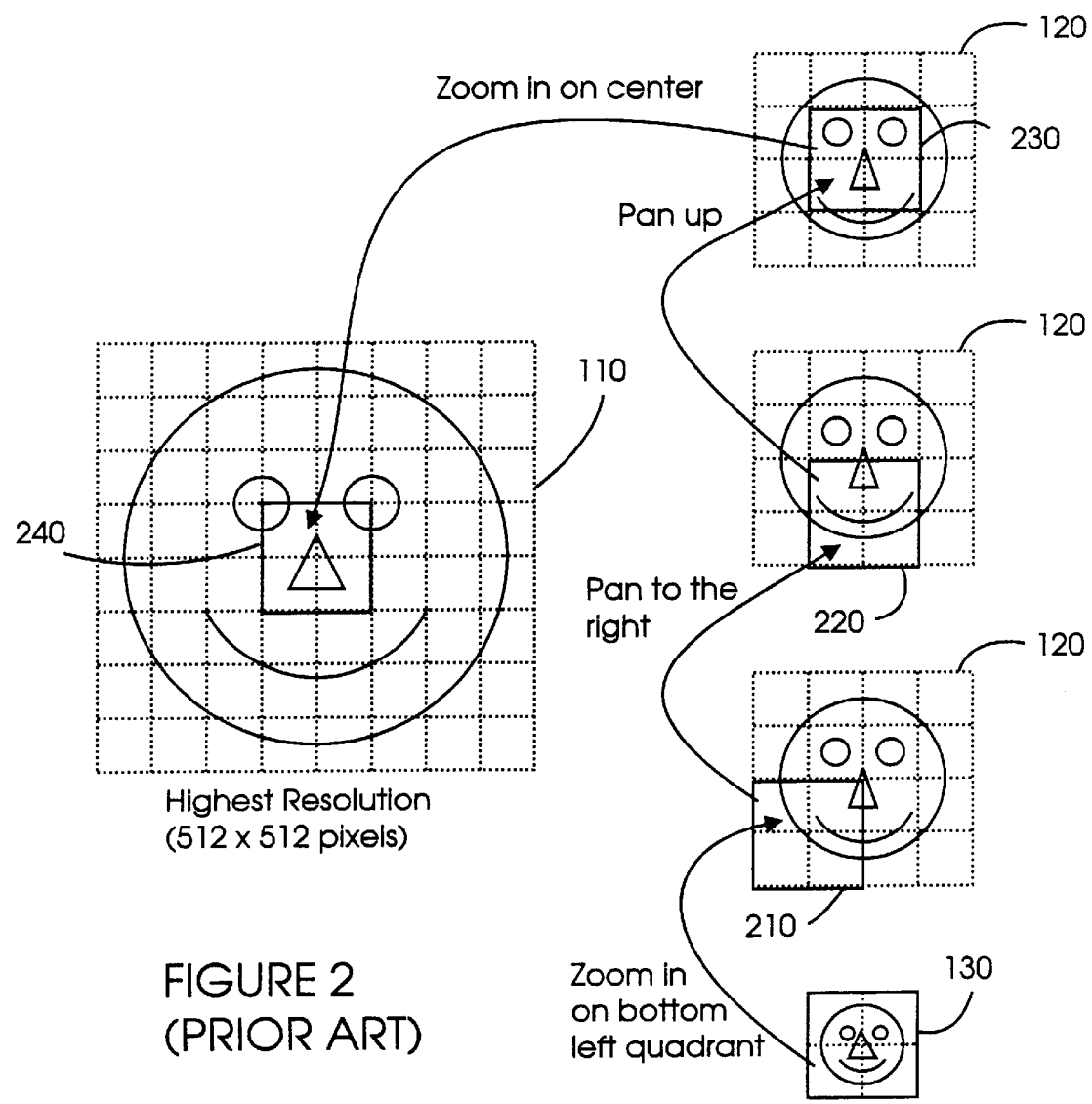
FIG. 2 is a simplified sketch of interactive user navigation within the multi-resolution tiled image from FIG. 1 in accordance with the prior art.

Reference is now made to FIG. 2 which is a simplified sketch of interactive user navigation within the multi-resolution tiled image from FIG. 1 in accordance with the prior art. For purposes of clarity and simplification it is assumed that a user has a viewing window of 128×128 pixels. Initially, in order to see the entire image, the image level 130 is used to provide a low resolution image that can fit in its entirety within the viewing window.

In order to display image level 130, four tiles must be transmitted from server to client. Upon seeing the image, a user clicks to zoom in on the lower left quadrant. As a result the four tiles from the next image level, comprising the lower left quadrant of image level 120, are transmitted and the 128×128 pixel image portion 210 is displayed. At this point the user is only seeing a portion of the full image within the view window.

The user then decides to navigate, or pan, to the right. The four tiles from the same image level, forming portion 220, are displayed. Note that portion 220 overlaps with two tiles of portion 210, so that the server is only required to transmit two additional tiles from this image level. The user then decides to navigate up. Four tiles from the same image level forming portion 230 are then displayed. Once again, the server is only required to transmit two additional tiles from this resolution. Finally, the user clicks to zoom in at the center of portion 230. Four tiles from the highest image level, comprising the 128×128 pixel portion 240, are then transmitted and displayed.

Since the user's viewing window is only 128×128 pixels, a sequence of image portions that the user views is 130-210-220-230-240.

Multi-resolution tiled image formats are particularly convenient for client-server systems, where the panorama is stored on a server computer, also referred to as a server, and is viewed by multiple client computers, also referred to as clients. When the panorama is stored in a multi-resolution tiled format, transmission over the Internet is very efficient, since individual tiles can be transmitted and cached upon request, without the need to transmit the entire image. Thus when a user desires to view a specific portion of the panorama at a specific magnification level, it is only necessary to transmit those tiles from an appropriate image level of the panorama that have data required for rendering the user's view.

For example, referring again to FIG. 2, when the user pans from portion 210 to portion 220, only the two rightmost additional tiles are newly exposed. The leftmost tiles of portion 220 are the same tiles forming the right half of portion 210. As such, these tiles are already available in cache.

For another example, suppose a panorama stored on a server is 15,000×15,000 pixels at full resolution, and a user wishes to view a portion of the panorama whose rendering requires data from the top left 10% of the panorama (i.e. the left 10% of the top 10%). Moreover, suppose the user's view window is 300×300 pixels. At full resolution, the top left 10% of the panorama is 1,500×1,500 pixels, so an appropriate resolution may be the resolution two levels down from the highest. At this resolution, the panorama is 3,750×3,750, and the top left 10% is 375×375. Since each tile is 64×64 pixels, the top left 10% of the panorama at this resolution spans an array of 6×6 tiles. Thus the server can fetch the 36 tiles at the top left of the panorama, and transmit these to the client. The client can render these tiles according to the perspective viewing geometry, and then display the resulting image.

Moreover, the 36 tiles can then be cached in the client, so that if the user adjusts the viewing parameters by navigation, thereby requesting a different view, those tiles from the previous view which are relevant to the current view are already available, and do not have to be transmitted once again from the server. Rendering each new scene may only involve transmitting a few new tiles every few frame refreshes once the first view is rendered.

Typically tiles of FLASHPIX images are JPEG compressed to approximately one-tenth of their raw size, so that a 64×64 pixel tile in RGB color space occupies approximately 1.2 Kbytes. Thus even a modem that effectively transmits only 1 Kbyte per second can deliver a new tile in approximately one second.

In order to further reduce delays stemming from network latency, a multi-resolution tiled format allows for "tile substitution" in accordance with a preferred embodiment of the present invention. Tile substitution preferably works by using a previously cached tile from a lower image level of the image to temporarily take the place of a desired tile, which is not currently available. The substitute tile is chosen so that it covers an image area which is larger than that of the desired tile and includes the image area covered by the desired tile. The substitute tile is then stretched so as to have the same scale as that of the desired tile. The portion of the substitute tile which overlies the area covered by the desired tile is then inserted in the intended place of the desired tile.

Tile substitution is useful when the desired tile has not been transmitted from the server to the client, and the portion of image it impacts needs to be rendered quickly. The substitute tile, being already available at the client, can be used immediately in accordance with a preferred embodiment of the present invention.

For example, suppose the top left tile from an image level one below the highest image level is required, but has not yet been delivered from a server to a client. In its place, however, the top left tile from an image level two levels below the highest may be available in cache. This lower resolution tile can substitute for the required higher resolution tile, but it covers four times the image area required.

Therefore, in accordance with a preferred embodiment of the present invention, the substitute tile can be stretched by a factor of two in each dimension, and its top left quarter can be used in place of the desired tile.

Figure 3:
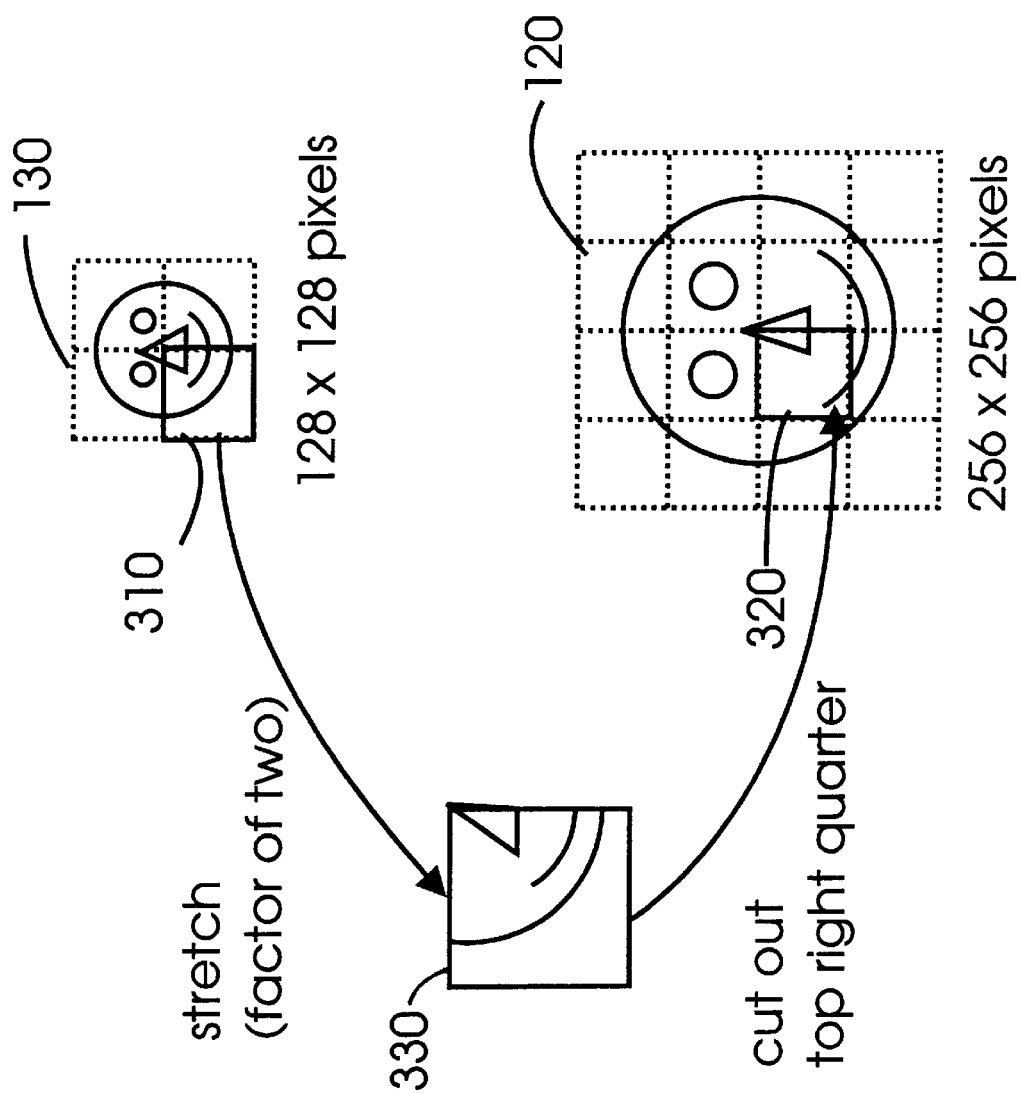
FIG. 3 is a simplified sketch of tile substitution in accordance with the present invention.

Reference is now made to FIG. 3, which is a simplified illustration of tile substitution in accordance with a preferred embodiment of the present invention. Suppose a user with a 128×128 viewing window wishes to see the middle portion of image 120. This is the portion labeled 230 in FIG. 2. Suppose tile 320 is not presently available, having not been transmitted from the server to the client. Instead, however, the four tiles comprising the lower image level with image 130 have already been transmitted, and are accessible from cache. Specifically, tile 310, which forms the lower left quarter of image 130, is available, and this tile covers the image area that the missing tile 320 is supposed to provide. However, tile 310 is at half the resolution that tile 320 is supposed to be at.

In this case, the client can substitute tile 310 for tile 320 by first stretching tile 310 by a factor of two, thereby forming a 128×128 pixel image portion 330. The top right quarter of image portion 330 can then be inserted in place of the missing tile 320.

Of course, the substitute tile does not have the same fine detail as the other tiles in the image layer of image 120. This is why substitution should only be used as a temporary way to overcome network latency. For example, substitute tiles can be used when the user is navigating rapidly, quickly changing the frame being displayed. When the user navigation stops, or slows down, the client can wait for missing tile 320, with its finer detail, to arrive from the server, and then insert it.

It is apparent to one skilled in the art that other substitute tile methodologies are possible, such as using four tiles from a lower image level of the image than the desired tile, reducing them to one quarter of their size and positioning them together. Similarly, one can substitute tiles from image levels differing by more than a single resolution level.

Figure 4:
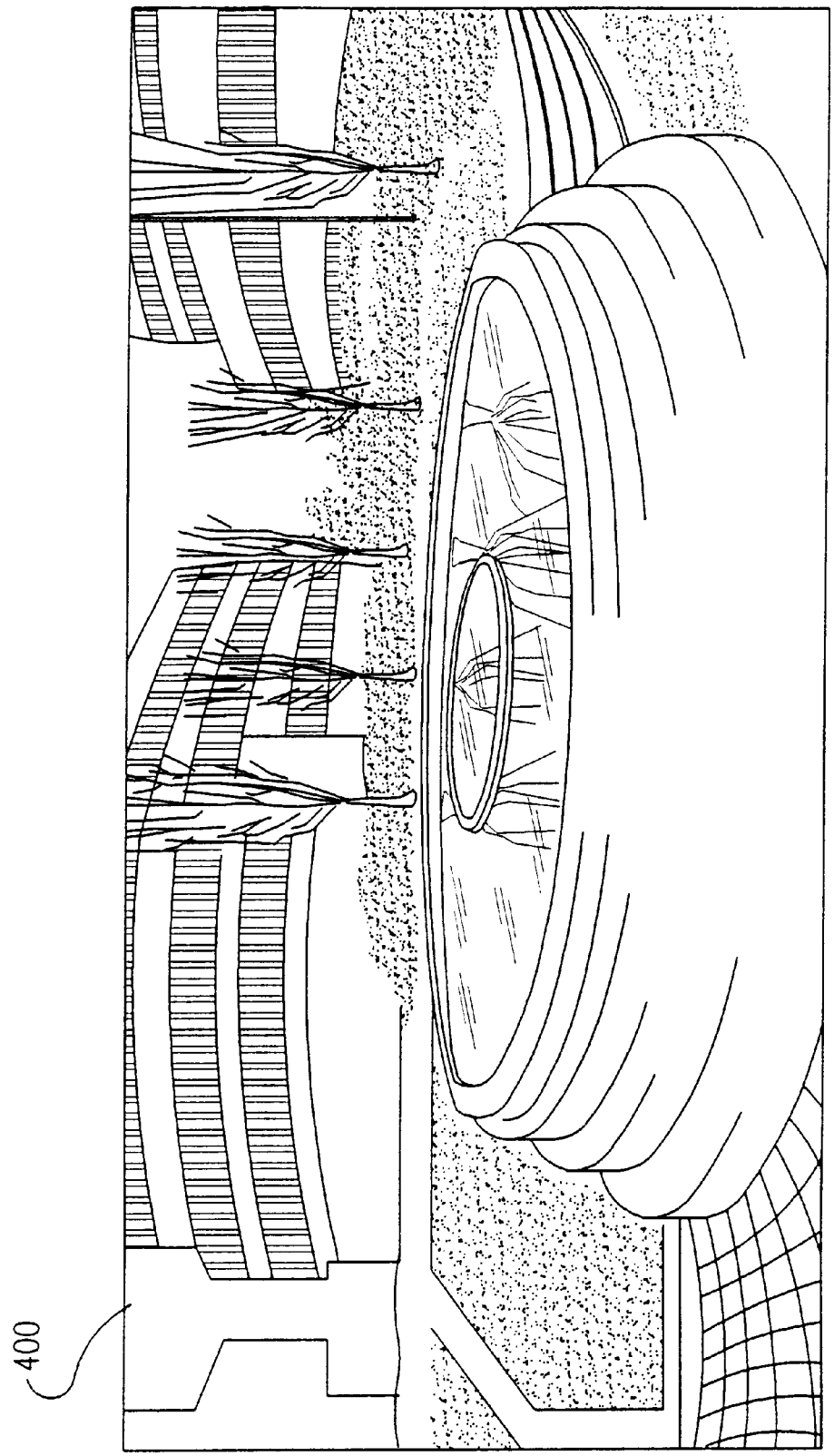
FIG. 4 illustrates a panoramic image of a scene.
Figure 5:
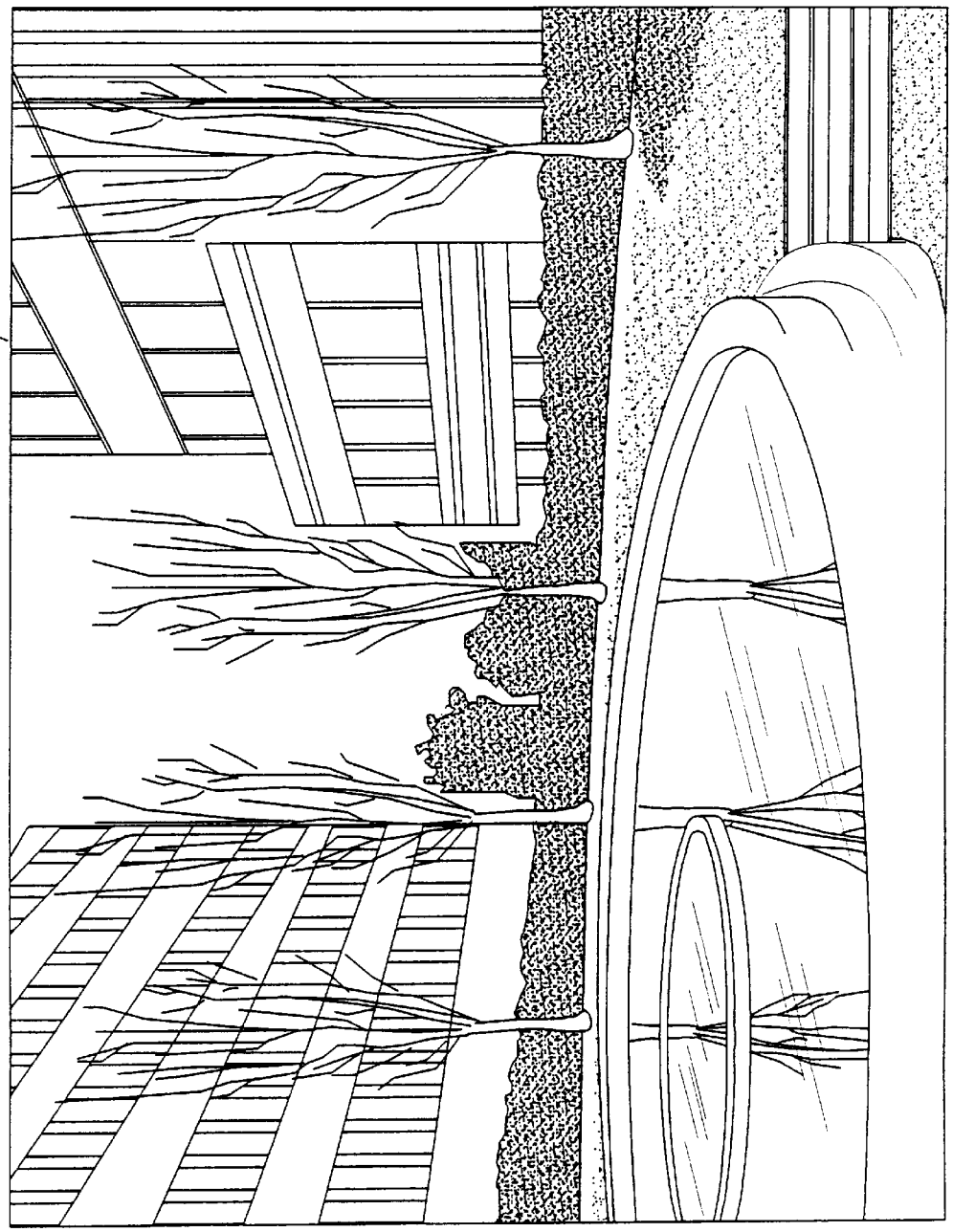
FIG. 5 is a destination image, which has been corrected for viewing perspective.

When dealing with panoramas, one has to distinguish between a source image residing on a server, and a destination image displayed in the user view window. FIG. 4 illustrates a panoramic image 400 of a scene. The panoramic image is typically a source image residing on a server. The image is projected onto a cylinder, and as such appears distorted, although it is correct relative to cylindrical coordinates. FIG. 5 illustrates a portion of the panorama from FIG. 4 being viewed. The image 500 in FIG. 5 is a destination image, which has been corrected for viewing perspective and no longer appears distorted.

Mapping from source image 400 to destination image 500 is non-linear. In fact, the relevant portion of source image 400 which appears in destination image 500 is not rectangular in shape, even though image 500 is rectangular. To render image 500, it is necessary for the client or server to apply perspective correction to the data from image 400. As distinct from the situation shown in FIG. 2 hereinabove, whereby the destination image displayed in the view window contains the same image data as the source image, when dealing with panoramas the source image data undergoes further processing before being displayed.

A reference for perspective correction transformations in viewing cylindrical panoramas is U.S. Pat. No. 5,396,583 entitled CYLINDRICAL TO PLANAR IMAGE MAPPING USING SCANLINE COHERENCE, the disclosure of which is hereby incorporated by reference. A reference for perspective correction transformations in viewing spherical panoramas is U.S. Pat. No. 5,446,833 entitled TEXTURED SPHERE AND SPHERICAL ENVIRONMENT MAP RENDERING USING TEXTURE MAP DOUBLE INDIRECTION, the disclosure of which is hereby incorporated by reference.

In a preferred embodiment, the present invention calculates a "bounding box" for every view to be rendered. The bounding box typically is a rectangular region in the panorama that encompasses all the source image pixel data required to render the view in the user's viewing window. It can be calculated analytically, by inverting the perspective correction transformation, or by computing the inverse source image pixel locations corresponding to selected pixel locations of the destination image, such as the four vertices and the mid-points of the four edges. By means of the bounding box, one can readily determine the appropriate resolution level and the tiles that need to be transmitted.

The size of the above bounding box changes as the pitch angle of the view changes. In order to avoid a situation whereby the resolution jumps from one level to another while a user is changing the pitch angle, an initial bounding box can preferably be computed corresponding to a pitch angle of zero. A pitch angle of zero corresponds to the smallest bounding box. An appropriate resolution level can be set based on this initial bounding box, and used henceforth with non-zero pitch angles. The resolution level appropriate for the initial bounding box is always high enough to satisfy the desired destination image sub-sampling rate, regardless of the pitch and yaw angle settings. In turn, this gives the user a smooth navigational experience when panning at a given zoom level.

When a given tile transmitted by the server has arrived at the client, the tile undergoes perspective correction before the data is passed to the destination image. Perspective correction can be done on a pixel-by-pixel basis, or preferably in an accelerated computation. For example, the scanlines of a tile can be mapped to scanlines within a polygonal portion of the destination image by means of linear interpolation. The polygonal portion is determined by the locations of its four vertices.

Linear interpolation is only approximate. If the approximation is not accurate enough, and can lead to visible artifacts, the tiles can be sub-divided into sub-tiles, each of which is perspective corrected by linear scanline interpolation. Sub-tiles could be, for example, quarter-tiles. Interpolating smaller sub-tile units leads to a more accurate approximation for the perspective correction.

Figure 6:
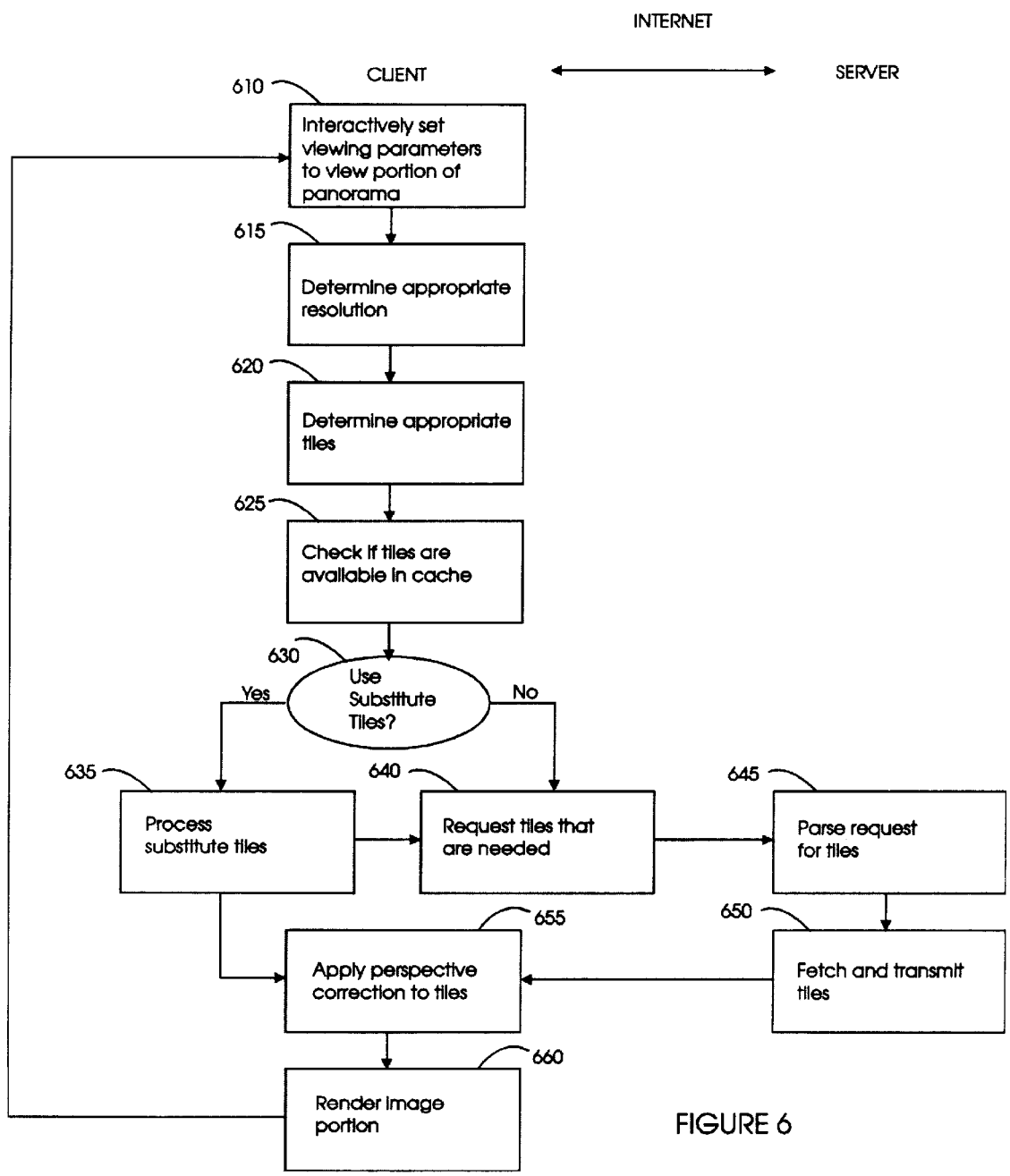
FIG. 6 is a simplified flow chart illustrating operation of a preferred embodiment of the invention.

Reference is now made to FIG. 6, which is a simplified flowchart of the operation of a preferred embodiment of the present invention. At step 610 a user interactively adjusts panorama viewing parameters by means of an input device such as a mouse or keyboard. By panning and/or zooming, the user sets the viewing direction and field of view, or equivalently, magnification level. The client uses this information, together with the pixel dimensions of the viewing window, in steps 615 through 660, to completely determine the destination image to be displayed.

At step 615 the client preferably uses a bounding box to determine the appropriate resolution level of the panorama from which to extract the source panorama data required in order to calculate the image for display. The bounding box bounds the portion of the panorama necessary to provide the required destination image. Preferably the pitch is temporarily set to zero before the bounding box is calculated, as this gives the smallest possible bounding box and, correspondingly, the highest possible resolution level that would be required for any viewing angles at the current magnification level. This ensures that the resolution level will not suddenly jump when a change in pitch angle alone occurs.

Step 615 does not have to be repeated when the field of view (i.e. magnification) remains unchanged. If the user only pans, thereby changing the pitch and yaw angles but not changing the field of view, the appropriate resolution level remains unchanged. Thus step 615 only needs to be performed whenever the user zooms in or out. Alternatively, the resolution levels could be pre-computed as a function of zoom level, and step 615 could be accomplished by a simple table look-up. This is particularly advantageous when the number of different possible zoom levels is small.

At step 620 the client determines which tiles from the resolution level determined at step 615 are appropriate for calculating the image to be displayed. This is also preferably done by means of a bounding box, but the bounding box used at step 620 should preferably have the correct pitch angle for the current viewing parameters. Once the bounding box is known, the appropriate tiles are easily determined. They are simply those tiles which are contained in or overlap the bounding box.

At step 625 the client examines its cache to see if some or all of the required tiles are already available. If so, these tiles do not have to be re-transmitted from the server.

At step 630 the client decides whether or not to use one or more substitute tiles, in order to speed up the rendering. Substitute tiles can be used to provide a quick initial "splash view," while the client waits for tiles to be delivered from a server in order to progressively improve the displayed image. The decision as to whether or not to use substitute tiles is based on what tiles are available in cache. It can also be based on how quickly the user is interactively changing the view, or on whether or not the user is interacting. When the user is changing the view quickly, many distortions go unnoticed, and the client can use approximate images rather than exact images. In fact, when the client is navigating quickly, the rapidly changing "splash views" may never have to be progressively improved, and the missing tiles may not have to be requested at all.

If substitute tiles are used, then at step 635 the client retrieves and processes the substitute tiles, as is described hereinabove with reference to FIG. 3. For example, the client might have to stretch the substitute tiles by a factor of two in each dimension, and then cut out one of the resulting quadrants.

At step 640 the client requests tiles that are needed from the server. An Internet protocol for making tile requests for multi-resolution tiled images is the Imaging Internet Protocol (IIP). In a preferred embodiment of the present invention, the request for tiles at step 640 is an IIP request using the TIL command. A reference for IIP is the document "Internet Imaging Protocol," ©1997 Hewlett Packard Company, Live Picture, Inc., and Eastman Kodak Company, the contents of which are hereby incorporated by reference.

Even if substitute tiles are used at step 635, the client may still request tiles from the server, in order to progressively improve the "splash view." Alternatively, it may not be necessary to request any tiles from the server, in which case control would pass directly from step 635 to step 655.

At step 645 the server receives the client request for tiles, and parses the request. In a preferred embodiment of the present invention, the request parsed is an IIP request.

At step 650 the server fetches and transmits the requested tiles.

At step 655 the client receives the transmitted tiles. Alternatively, if substitute tiles are used, then at step 655 the client has the replacement tiles available. The client then applies perspective correction to each tile, in accordance with the viewing parameters. Perspective correction can be computed exactly, by using the projection equations for cylindrical or spherical panoramic geometry. Alternately, in order to speed up the rendering, approximate calculations may be used, such as linear interpolation. As described hereinabove regarding substitute tiles, the decision as to whether or not to use approximate calculations can be based on how quickly the user is navigating, or on whether the user is interacting.

It is apparent to those skilled in the art that step 655 can be carried out simultaneously with delivery of tiles from the server to the client, and that the client need not wait for all requested tiles to arrive in order to begin applying perspective correction. Since perspective correction is applied on a tile-by-tile basis, a tile can undergo the processing of step 655 as soon as it is received by the client.

Finally, at step 660 the client uses the perspective corrected image data to render an image portion representing the desired perspective view of the panorama. Control then returns back to step 610 where the user continues to interactively navigate.

It will be appreciated by persons skilled in the art that the present invention is not limited by what has been particularly shown and described hereinabove. Rather the present invention includes combinations and sub-combinations of the various features described hereinabove as well as modifications and extensions thereof which would occur to a person skilled in the art and which do not fall within the prior art.

What is claimed is:

1. A method for viewing scenes over a server-client network comprising:
    storing multiple resolutions of an environment map of a scene on a server, each resolution being stored as a plurality of image tiles;
    receiving at a server from a client a request to view a perspective portion of the scene;
    selecting a resolution from the multiple resolutions of the environment map, corresponding to the perspective portion of the scene requested by the client for viewing;
    further selecting at least one image tile from the stored plurality of image tiles for the selected resolution of the environment map, corresponding to the perspective portion of the scene requested by the client for viewing;
    transmitting from the server to the client the selected at least one image tile; and
    carrying out an individual tile-wise perspective correction on the selected at least one image tile.

2. A method for viewing scenes according to claim 1 and wherein said carrying out an individual tile-wise perspective correction takes place at the client.

3. A method for viewing scenes according to claim 1 and wherein said carrying out an individual tile-wise perspective correction includes carrying out a linear transformation of data in each of the selected at least one image tile.

4. A method for viewing scenes according to claim 1 and wherein said carrying out an individual tile-wise perspective correction takes place at the server.

5. A method for viewing scenes according to claim 1 and wherein said carrying out an individual tile-wise perspective correction includes carrying out a linear transformation of data in each of the selected at least one image tile.

6. A method for viewing scenes according to claim 1 and wherein the selected resolution also corresponds to dimensions of a viewing window available to the client.

7. A method for viewing scenes according to claim 2 and wherein the selected resolution also corresponds to dimensions of a viewing window available to the client.

8. A method for viewing scenes according to claim 4 and wherein the selected resolution also corresponds to dimensions of a viewing window available to the client.

9. A method for viewing scenes according to claim 1 and also comprising:

caching image tiles, received from the server, at the client; and in response to client requests which require at least one image tile of the environment map at a first resolution, temporarily employing at least one image tile of the environment map cached at the client, at a resolution different from said first resolution, until at least one required image tile is received from the server.

10. A system for viewing scenes operating over a server-client network, the system comprising:

an image store storing multiple resolutions of an environment map of a scene on a server, each resolution being stored as a plurality of image tiles;

a data processor, operative in response to a client request to view a perspective portion of the scene, to select a resolution from the multiple resolutions of the environment map, and to further select at least one image tile from the stored plurality of image tiles for the selected resolution of the environment map, the selected resolution and the selected at least one image tile corresponding to the perspective portion of the scene requested by the client for viewing;

a transmitter transmitting from the server to the client the selected at least one image tile corresponding to the perspective portion of the scene requested by the client; and an image processor carrying out an individual tile-wise perspective correction on the selected at least one image tile.

11. A panorama viewing system according to claim 10 and wherein said image processor is situated at the client.

12. A system for viewing scenes according to claim 11 and wherein said image processor carries out a linear transformation of data in each of the selected at least one image tile.

13. A panorama viewing system according to claim 10 and wherein said image processor is situated at the server.

14. A system for viewing scenes according to claim 13 and wherein said image processor carries out a linear transformation of data in each of the selected at least one image tile.

15. A system for viewing scenes according to claim 10 and wherein the selected resolution also corresponds to dimensions of a viewing window available to the client.

16. A system for viewing scenes according to claim 11 and wherein the selected resolution also corresponds to dimensions of a viewing window available to the client.

17. A system for viewing scenes according to claim 13 and wherein the selected resolution also corresponds to dimensions of a viewing window available to the client.

18. A system for viewing scenes according to claim 10 and also comprising:

a cache for caching image tiles, received from the server, at the client; and a tile substitutor, temporarily employing, in response to client requests which require at least one image tile of the environment map at a first resolution, at least one image tile of the environment map cached at the client, at a resolution different from said first resolution, until at least one required image tile is received from the server.

19. A method for viewing scenes according to claim 1 further comprising determining a bounding box surrounding a portion of the environment map that is required in order to generate the perspective portion of the scene requested by the client.

20. A method for viewing scenes according to claim 19 further comprising calculating an initial bounding box based on an adjusted perspective portion of the scene, the adjusted perspective portion of the scene corresponding to the perspective portion of the scene requested by the client but having a pitch angle of zero.

21. A method for viewing scenes according to claim 20 wherein the selected resolution corresponds to the initial bounding box.

22. A method for viewing scenes according to claim 21 wherein the selected at least one image tile is at least one image tile for the selected resolution of the environment map that is contained within the bounding box.

23. A method for viewing scenes according to claim 21 wherein the selected at least one image tile is at least one image tile for the selected resolution of the environment map that overlaps with the bounding box.

24. A system for viewing scenes according to claim 10 further comprising a bounding box calculator determining a bounding box surrounding a portion of the environment map that is required in order to generate the perspective portion of the scene requested by the client.

25. A system for viewing scenes according to claim 10 wherein said bounding box calculator calculates an initial bounding box based on an adjusted perspective portion of the scene, the adjusted perspective portion of the scene corresponding to the perspective portion of the scene requested by the client but having a pitch angle of zero.

26. A system for viewing scenes according to claim 25 wherein the selected resolution corresponds to the initial bounding box.

27. A system for viewing scenes according to claim 26 wherein the selected at least one image tile is a tile for the selected resolution of the environment map that is contained within the bounding box.

28. A system for viewing scenes according to claim 26 wherein the selected at least one image tile is a tile for the selected resolution of the environment map that overlaps with the bounding box.

* * * * *